United States Patent
Tanaka et al.

(10) Patent No.: US 6,896,867 B2
(45) Date of Patent: May 24, 2005

(54) PROCESS FOR PRODUCING A PURIFIED AQUEOUS HYDROGEN PEROXIDE SOLUTION

(75) Inventors: Fujio Tanaka, Sendai (JP); Ichiro Sugawara, Sendai (JP); Takashi Adachi, Sendai (JP); Kazuhisa Mine, Sendai (JP)

(73) Assignee: Santoku Chemical Industries Co., Ltd., Tokyo (JP)

( * ) Notice: Subject to any disclaimer, the term of this patent is extended or adjusted under 35 U.S.C. 154(b) by 383 days.

(21) Appl. No.: 09/855,107

(22) Filed: May 14, 2001

(65) Prior Publication Data

US 2002/0020671 A1 Feb. 21, 2002

(30) Foreign Application Priority Data

Jun. 21, 2000 (JP) .................................. 2000-186903
Dec. 6, 2000 (JP) .................................. 2000-371995

(51) Int. Cl.$^7$ ............................................. C01B 15/01
(52) U.S. Cl. ....................................................... 423/584
(58) Field of Search .......................................... 423/584

(56) References Cited

U.S. PATENT DOCUMENTS

| | | | |
|---|---|---|---|
| 3,294,488 A | * 12/1966 | Dunlop et al. | 423/584 |
| 3,297,404 A | * 1/1967 | Elliott et al. | 423/584 |
| 3,387,938 A | * 6/1968 | Leaver | 423/584 |
| 4,999,179 A | * 3/1991 | Sugihara et al. | 423/584 |
| 5,055,286 A | * 10/1991 | Watanabe et al. | 423/584 |
| 5,200,166 A | * 4/1993 | Shiga et al. | 423/584 |
| 5,534,238 A | * 7/1996 | Kajiwara et al. | 423/584 |
| 5,614,165 A | * 3/1997 | Sugihara et al. | 423/584 |
| 5,733,521 A | * 3/1998 | Minamikawa et al. | 423/584 |
| 5,851,402 A | 12/1998 | Dhalluin et al. | |
| 5,851,505 A | * 12/1998 | Nishide et al. | 423/584 |
| 5,928,621 A | * 7/1999 | Ledon et al. | 423/584 |
| 5,932,187 A | * 8/1999 | Ledon et al. | 423/584 |
| 5,961,947 A | * 10/1999 | Ledon et al. | 423/584 |
| 5,976,487 A | * 11/1999 | Kajiwara et al. | 423/584 |
| 6,001,324 A | * 12/1999 | Ledon et al. | 423/584 |
| 6,054,109 A | * 4/2000 | Saito et al. | 423/584 |

FOREIGN PATENT DOCUMENTS

| | | |
|---|---|---|
| EP | 0 774 442 A1 | 5/1997 |
| FR | 02772740 A | 6/1999 |
| JP | 35(1960)-16677 | 2/1958 |
| JP | 05(1993)-017105 | 1/1993 |
| JP | 07-172805 | 7/1995 |
| JP | 07-187616 | 7/1995 |
| JP | 08-073205 | 3/1996 |
| JP | 08-337405 | 12/1996 |
| JP | 09-012306 | 1/1997 |
| JP | (1997) 09-278416 A | 10/1997 |
| JP | 10-67505 A | 3/1998 |
| JP | 10-259009 A | 9/1998 |
| JP | 11-180704 A | 7/1999 |

OTHER PUBLICATIONS

Patent Abstracts of Japan, vol. 1997, No. 05, May 30, 1997.
JP 9–020505 A, (Sumitomo Chem. Co. Ltd.), Jan. 21, 1997.

* cited by examiner

Primary Examiner—Wayne A. Langel
(74) Attorney, Agent, or Firm—Webb Ziesenheim Logsdon Orkin & Hanson, P.C.

(57) ABSTRACT

A process for producing a purified aqueous hydrogen peroxide solution comprises contacting an aqueous hydrogen peroxide solution containing metal ion impurities firstly with a $H^+$ type cation exchange resin, secondly with a carbonate iron ($CO_3^{2-}$) type or bicarbonate ion ($HCO_3^-$) type anion exchange resin, and thirdly with a $H^+$ type cation exchange resin. Further, a process for producing a purified aqueous hydrogen peroxide solution comprises contacting an aqueous hydrogen peroxide solution containing metal ion impurities firstly with a $H^+$ type cation exchange resin, secondly with a fluoride ion ($F^-$) type anion exchange resin, thirdly with a carbonate ion ($CO_3^{2-}$) type or bicarbonate ion ($HCO_3^-$) type anion exchange resin, and fourthly with a $H^+$ type cation exchange resin.

23 Claims, No Drawings

PROCESS FOR PRODUCING A PURIFIED AQUEOUS HYDROGEN PEROXIDE SOLUTION

FIELD OF THE INVENTION

The present invention relates to a process for producing a purified aqueous hydrogen peroxide solution. More particularly, the present invention relates to a process for producing a high purity aqueous hydrogen peroxide solution capable of removing metal and cation impurities (metal ion impurities) contained in an aqueous hydrogen peroxide solution as impurities with high precision to a ppt level ($1/10^{12}$) or its vicinities.

BACKGROUND OF THE INVENTION

An aqueous hydrogen peroxide solution is widely used in various fields, for example, for a bleaching agent for paper or pulp and as a component in chemical polishing fluids. In recent years, the aqueous hydrogen peroxide solution has increasingly been used in the electronic industry, for example, as a cleaning agent for silicon wafers and as a cleaning agent in production processes of semiconductors. Accordingly it is required for the aqueous hydrogen peroxide solution that a very high purity be achieved by extremely decreasing all impurities contained in the aqueous hydrogen peroxide solution.

Hydrogen peroxide is produced almost exclusively by the anthraquinone process at present. The anthraquinone process is generally conducted as follows. A derivative of anthraquinone, such as 2-alkylanthraquinone, is converted into anthrahydroquinone by hydrogenation in a water-insoluble solvent in the presence of a hydrogenation catalyst. After the catalyst is removed, the reaction product is oxidized with air to regenerate the original 2-alkylanthraquinone, and at the same time hydrogen peroxide is produced. By extracting the produced hydrogen peroxide from the oxidation product with water, an aqueous solution containing hydrogen peroxide can be obtained. This method is so-called anthraquinone autooxidation method.

The aqueous hydrogen peroxide solution obtained by said method contains metal ion impurities such as Al, Fe, and Cr originated from materials of equipment. Generally, such ion impurities are contained in an amount of tens of mg to a few μg/liter in an aqueous hydrogen peroxide solution having the concentration of 10 to 70% by weight.

When such aqueous hydrogen peroxide solution containing metal ion impurities is used in the field of production processes of semiconductors, the reliability of obtained semiconductors is sometimes considerably lowered. Particularly, recently the required level for reliability of semiconductor becomes much higher. Therefore, an aqueous hydrogen peroxide solution is necessarily purified to a further lower level of concentration of each of metal ion components, for example, to a ppt level.

Conventionally, as a method of purifying and removing metal ion impurities contained in an aqueous hydrogen peroxide solution, there is proposed a method comprising bringing a $H^+$ type strongly acidic cation exchange resin containing a sulfonic acidic group into contact with an aqueous hydrogen peroxide solution. However, merely by contacting the strongly acidic cation exchange resin with the aqueous hydrogen peroxide solution, although metal ion impurities such as Na are removed, it is difficult to remove impurities which are not dissolved completely in the aqueous hydrogen peroxide solution and/or which are originated from metal such as Al, Fe and Cr easily forming a complex with a hydroxide ion. There is a further problem in that a cation exchange resin is deteriorated when coming in contact with the aqueous hydrogen peroxide solution, and thereby, a large amount of sulfate ion is generated from a $SO_3H$ group of the cation exchange resin.

In an effort to solve the above problems, there is also known a method that after contact with an aqueous hydrogen peroxide solution and a cation exchange resin, further contact with an $OH^-$ type strongly basic anion exchange resin having a quaternary ammonium group is carried out. By said method, the impurities which cannot be removed by a strongly acidic cation exchange resin can be removed.

However, in the use of the $OH^-$ type strongly basic anion exchange resin, the aqueous hydrogen peroxide solution is sometimes decomposed when coming in contact with hydroxide ion ($OH^+$) contained in the anion exchange resin, and the decomposition is sometimes further accelerated by the existence of metal ion impurities such as Fe and Cr in the aqueous hydrogen peroxide solution.

In the meantime, as a method removing metal ion impurities while controlling decomposition of an aqueous hydrogen peroxide solution, for example, Japanese Patent Publication No. 35(1960)-16677 discloses that an ion form in an anion exchange resin is converted from a hydroxide ion type into a carbonate ionic type or a bicarbonate ion type, that means lowering the degree of the basicity, and thereby the anion exchange resin can be used. Also, Japanese Patent Laid-open Publication No. 5(1993)-17105 discloses a method that at bringing an aqueous hydrogen peroxide solution into contact with an anion exchange resin, acid is added.

However, in the above cases, undissolved metal ion impurities in an aqueous hydrogen peroxide solution and metal ion impurities which easily form a complex together with a hydroxide ion are not removed completely and remain. Therefore a high purity aqueous hydrogen peroxide can not be obtained. Due to the influence of the metal impurities which easily form a complex together with a hydroxide ion and the remaining metal ion impurities, it is difficult to fully prevent the decomposition of hydrogen peroxide. As a result, it is difficult to purify an aqueous hydrogen peroxide solution safely.

As a method for producing safely and effectively a high purity aqueous hydrogen peroxide solution from which the metal ion impurities, such as Al, Fe and Cr, are removed up to a lower concentration, for example, in the Japanese Patent Laid-open Publication No. 8-73205, there is proposed a method that at purifying an aqueous hydrogen peroxide solution, to the aqueous hydrogen peroxide solution is added acid having an acid dissociation index ($pK_a$) of 5 or less in an amount of 0.05 to 5 milligram equivalent per 1 liter of the hydrogen peroxide solution, followed by bringing the solution into contact with a $H^+$ type strongly acidic cation exchange resin containing a sulfonic acid group or a mixed bed of a $H^+$ type strongly acidic cation exchange resin containing a sulfonic acid group and a strongly basic anion exchange resin.

Further, Japanese Patent Laid-open Publication No. 7-187616 discloses a method using a strongly acidic anion exchange resin having a cross-linkage degree of 5 or less. Japanese Patent Laid-open Publication No. 7-172805 discloses a method using an anion exchange resin converted into carbonate ion type or bicarbonate ion type by ammonium carbonate or ammonium bicarbonate. In Japanese Patent Laid-open Publication No. 7-172805, there is disclosed that the anion exchange resin is used optionally in combination with a cation exchange resin.

Furthermore, Japanese Patent Laid-open Publication No. 8-337405 discloses that metal ion impurities are removed by the use of an ion exchange resin which is primarily contacted with a high purity inorganic acid aqueous solution having a metal ion content of 0.1 ppb by weight or less and then with an ultra-pure water having a metal ion content of 0.1 ppb by weight or less. Japanese Patent Laid-open Publication No. 9-12306 discloses a method that metal ion impurities are removed by the use of an ion exchange resin contacted with an aqueous hydrogen peroxide solution having a metal ion content of 20 ppt or less.

However, by using the above-mentioned methods, metal ion impurities can be removed merely to 1 ppb level. Therefore, aqueous hydrogen peroxide solutions purified by conventionally known methods are difficult to be used for fields such as the electronic industry requiring a high purity quality. Further, some of the above-mentioned conventional purifying methods are not practical to use since the production cost is expensive by using a high purity inorganic acid aqueous solution and an aqueous hydrogen peroxide solution having a metal ion component concentration of 20 ppt or less.

Under these circumstances, the present inventors conducted extensive studies to solve the above-mentioned problems and found that metal ion impurities in an aqueous hydrogen peroxide solution can be removed up to a ppt level ($1/10^{12}$) by bringing the aqueous hydrogen peroxide solution into contact with, firstly, a $H^+$ type cation exchange resin, secondly, with a carbonate ion ($CO_3^{2-}$) type or bicarbonate ion ($HCO_3^-$) type anion exchange resin, optionally with a fluoride ion ($F^-$) type anion exchange resin, and thirdly, again with a $H^+$ type cation exchange resin and, further, that the purifying method has the high duplicativity of the metal ion impurities removing level. The present invention has been accomplished on the basis of these discoveries.

There are conventionally known purifying methods comprising contacting an aqueous hydrogen peroxide solution with a cation exchange resin and then with an anion exchange resin and a purifying method using a mixed bed of a cation exchange resin and an anion exchange resin. (For example, see Japanese Patent Laid-open Publication No. 8-73205.) The inventors, however, found, in the methods, metal ion impurities such as Na, K and Al, originating from the final anion exchange resin, elute into an aqueous hydrogen peroxide solution, and thereby exist as metal ion impurity. Furthermore, the inventors found that when the metal ion impurities such as Na, K and Al originated from the anion exchange resin are removed again by the cation exchange resin, metal ion impurities can be removed up to a considerably high purity level and also the duplicativity of the removing level is high.

An object of the present invention is to provide a purifying process of an aqueous hydrogen peroxide solution in which metal ion impurities and the metal ion impurities are removed as completely as possible.

SUMMARY OF THE INVENTION

The process for producing a purified aqueous hydrogen peroxide solution of the present invention comprises contacting an aqueous hydrogen peroxide solution containing metal ion impurities firstly with a $H^+$ type cation exchange resin, secondly with a carbonate ion ($CO_3^{2-}$) type or bicarbonate ion ($HCO_3^-$) type anion exchange resin, and thirdly with a $H^+$ type cation exchange resin.

Further the process for producing a purified aqueous hydrogen peroxide solution of the present invention comprises contacting an aqueous hydrogen peroxide solution containing metal ion impurities firstly with a $H^+$ type cation exchange resin, secondly with a fluoride ion ($F^-$) type anion exchange resin, thirdly with a carbonate ion ($CO_3^{2-}$) type or bicarbonate ion ($HCO_3^-$) type anion exchange resin, and fourthly with a $H^+$ type cation exchange resin.

As described above, the treatments of three-step or four-step of ion exchange resin lead to the production of a high-purity aqueous hydrogen peroxide solution from which ion impurities are removed as completely as possible.

In said process for producing a purified aqueous hydrogen peroxide solution, it is desirable to bring an aqueous hydrogen peroxide solution into contact with the adsorption resin before the aqueous hydrogen peroxide solution is contacted with the first $H^+$ type cation exchange resin.

Said $H^+$ type cation exchange resin is preferably regenerated by repeating a process, 2 or more times, in which a cation exchange resin is treated with an inorganic acid aqueous solution and then washed with ultra-pure water.

Also, said carbonate ion ($CO_3^{2-}$) type or bicarbonate ion ($HCO_3^-$) type anion exchange resin is preferably regenerated by repeating a process, 2 or more times, in which an anion exchange resin is treated with a sodium carbonate or sodium bicarbonate aqueous solution and then washed with ultra-pure water.

The fluoride ion ($F^-$) type anion exchange resin is preferably regenerated by repeating a process, 2 or more times, in which an anion exchange resin is treated with at least one fluorine compound aqueous solution selected from the group consisting of sodium fluoride, potassium fluoride and ammonium fluoride and then washed with ultra-pure water.

The adsorption resin is preferably regenerated by treating with an alcohol aqueous solution as a regenerant and then washing with ultra-pure water.

The hydrogen peroxide concentration in an aqueous solution is desirably 40 to 70% by weight, preferably 45 to 65% by weight. The use of an aqueous hydrogen peroxide solution having such high concentration makes it possible particularly to remove impurities effectively.

Said purified aqueous hydrogen peroxide solution is preferably obtained by filtrating solid impurities contained in the aqueous hydrogen peroxide solution to which a flocculating agent has been preliminarily added, by a fine filter. By preliminarily adding a flocculating agent into an aqueous hydrogen peroxide solution and filtrating impurities by a fine filter, the insoluble metal ion impurity components which can not be removed by the ion exchange treatment are removed, As a result, metal ion impurities in the aqueous hydrogen peroxide solution can be removed up to a ppt level ($1/10^{12}$) or its vicinities. Further, such filtration leads high duplicativity of the metal ion impurities removing level which is accomplished at a treatment by an ion exchange resin, as described later.

Said flocculating agent is preferably at least one phosphorus compound selected from the group consisting of phosphoric acid, polyphosphoric acid, acidic sodium pyrophosphate, aminotri(methylenephosphonic acid) and salt thereof, and ethylenediaminetetra (methylenephosphonic acid) and salt thereof. The phosphorus compound is added in an amount that the atomic ratio (Al/P) of the Al ion impurities contained in the aqueous hydrogen peroxide solution in terms of a metal atom Al to the phosphorus based compound in terms of a phosphorus atom is 0.045 or less. By the filtration, insoluble metal ion impurity components as well as silicon oxide based impurities are effectively removed.

The fine filter used for the present invention preferably has an average pore size of 0.2 µm or less.

DETAILED DESCRIPTION OF THE INVENTION

The process for producing a purified aqueous hydrogen peroxide solution of the present invention is described more in detail. In the present specification, %, ppm, ppb and ppt denote % by weight, ppm by weight, ppb by weight and ppt by weight, respectively.

The starting aqueous hydrogen peroxide solution produced by a known method such as the anthraquinone process or a direct synthetic process comprising reacting hydrogen and oxygen directly is used in the present invention.

Generally, an aqueous hydrogen peroxide solution contains several ppb to tens of ppm level of metal ion impurities. The impurities include metal ion impurities such as Ag, Al, As, Au, B, Ba, Be, Bi, Ca, Cd, Co, Cr, Fe, Ga, Ge, In, K, Li, Mg, Mo, Na, Nb, Ni, Pb, Pd, Pt, Sb, Sr, Ta, Ti, Tl, V, Zn and Zr, silicon oxide impurities and organic impurities. The impurities are originated from, for example, residues such as catalysts used in producing an aqueous hydrogen peroxide solution by the anthraquinone process, decomposition products of anthraquinone, solvents used in producing of an aqueous hydrogen peroxide solution, water used in producing (e.g. extracting, distilling and diluting of the aqueous hydrogen peroxide), floating dust in the air and materials of production equipments.

The hydrogen peroxide concentration in its aqueous solution is desirably 40 to 70% by weight, preferably 45 to 65% by weight. The use of an aqueous hydrogen peroxide solution having such high concentration is capable of removing particularly silicon oxide based impurities effectively.

Adsorption Resin Treatment

In the process for producing a purified aqueous hydrogen peroxide solution of the present invention, an aqueous hydrogen peroxide solution may be contacted with an adsorption resin before being brought into contact with an ion exchange resin.

As the adsorption resin, a porous resin having no ion exchangeability is used. The porous resin comprises a styrene-divinylbenzene copolymer and has no ion exchange group. The porous resin desirably has a specific surface area which is measured by the BET method using nitrogen gas, in a dry resin of about 200 to 900 m$^2$/g, preferably 400 to 900 m$^2$/g. Further, such resins are desirable as having continuous pore of a pore volume in a dry state of about 0.6 to 1.2 ml/g, preferably about 0.1 to 1.1 ml/g as measured by mercury porosimetry method. As the porous resin, a resin which is constituted from polystyrene crosslinked by divinylbenzene and having a network structure can be used. Such adsorption resin includes Amberlite XAD-2 and XAD-4 produced by Rohm & Haas Company and HP10, HP20, HP21, HP30, HP40, HP50, SP800 and SP900 produced by Mitsubishi Chemical Corporation.

Further, a porous resin containing halogen can be used as an adsorption resin. Preferable examples of the halogen-containing porous resin include a halide of a crosslinked polymer of an aromatic monovinyl monomer such as styrene and vinyltoluene and an aromatic polyvinyl monomer such as divinylbenzene and trivinylbenzene, a crosslinked polymer of a halogenated aromatic monovinyl monomer such as monochlorostyrene and monobromstyrene and an aromatic polyvinyl monomer and a crosslinked polymer of a halogenated aromatic monovinyl monomer, an aromatic monovinyl monomer and an aromatic polyvinyl monomer. As the halogen-containing porous resin, a halide of styrene-divinylbenzene copolymer is preferably used, and, for example, the trade name, "SEPABEADS SP207", which is a copolymer of brominated styrene and divinylbenzene and has a specific gravity of about 1.2, can be listed. Further there can be used the adsorption resin in which a hydrophilic group such as a hydroxyl group, chloroalkyl group or a hydroxy alkyl group is introduced into a crosslinked copolymer of an aromatic monovinyl monomer and an aromatic polyvinyl monomer. The chloroalkyl group is represented by the formula of —(CH$_2$)$_n$Cl and the hydroxy alkyl group is represented by the formula of —(CH$_2$)$_n$OH. The longer a straight chain of alkyl group is, the weaker the hydrophilic property is, and therefore, practically preferable are those having n of 1 to 5. The resins are commercially available items. For example, the trade name "Bofazit EP63" produced by Bayer AG is well known.

By such treatment process, impurities, especially organic impurities contained in an aqueous hydrogen peroxide solution, can be highly reduced, and the amount of total organic carbon (TOC) in an aqueous hydrogen peroxide solution can be reduced.

The adsorption resin is desirably regenerated by an alcohol aqueous solution as a regenerant and further desirably regenerated by washing by ultra-pure water after the treatment by the alcohol aqueous solution as a regenerant.

As an alcohol, employable is methanol, ethanol and 2-propanol.

The concentration of the alcohol aqueous solution is preferably 10 to 60% by weight, more preferably 25 to 45% by weight.

The regenerant is used in a volume equivalent to that of the adsorption resin to be treated or more, preferably 2 to 4 times as much volume as that of adsorption resin. The method of contacting an adsorption resin and a regenerant is a continuous flow process in which through the column packed with an adsorption resin, a regenerant is passed through upward at a SV (space velocity) of 3 to 6 Hr$^{-1}$ and a BV (Bed volume shows how many times the volume of the ion exchange is treated with and the unit is represented by L/L-R.) of 2 to 4 L/L-R. Further, after the flow of the regenerant, an ultra-pure water washing process comprising passing through downflow of ultra-pure water and upflow of ultra-pure water is repeated 4 to 9 times to further wash the after-regenerated ion exchange resin. The upflow of ultra-pure water is passed through preferably at a SV of 10 to 30 Hr$^{-1}$ and a BV of 3 to 5 L/L-R, and downflow of ultra-pure water is preferably passed through at a SV of 10 to 30 Hr$^{-1}$ and a BV of 3 to 5 L/L-R. It is preferred that washing is carried out with ultra-pure water in an amount (volume) of 30 to 60 times as much as that of the resin. shows how many times of the volume of the ion exchange it treated with and the unit is represented by L/L-R.) of 2 to 4 L/L-R. Further, after the flow of the regenerant, an ultra-pure water washing process comprising passing through of downflow of ultra-pure water and upflow of ultra-pure water is repeated 4 to 9 times to further wash the after-regenerated ion exchange resin. The upflow of ultra-pure water is passed through preferably at a SV of 10 to 30 Hr$^{-1}$ and a BV of 3 to 5 L/L-R and downflow of ultra-pure water is preferably passed through at a SV of 10 to 30 Hr$^{-1}$ and a BV of 3 to 5 L/L-R. It is preferred that washing is carried out with ultra-pure water in an amount (volume) of 30 to 60 times as much as that of the resin.

H+ Type Cation Exchange Resin Treatment (First)

In the process for producing a purified aqueous hydrogen peroxide solution of the present invention, after the aqueous hydrogen peroxide solution is optionally treated with the adsorption resin, the aqueous hydrogen peroxide solution is contacted with a H+ type cation exchange resin.

The H+ type cation exchange resin used for the invention is one conventionally known as a strongly acidic cation exchange resin. Generally, the strongly acidic cation exchange resin preferably has a network structure in which a sulphonic acid group is introduced into a styrene-divinylbenzene crosslinked copolymer. The degree of cross linkage of such cation exchange resin is usually 6 to 10, preferably 7 to 9.

The H+ type strongly acidic cation exchange resin includes, for example, PK216, SK1B and IR-120B.

The H+ type cation exchange resin is preferably regenerated by repeating a process, 2 times or more, preferably 2 to 12 times, in which a cation exchange resin is treated with a downflow of inorganic acid aqueous solution (a regenerant) and then washed with upflow of ultra-pure water.

Usually, regeneration of a cation exchange resin is carried out by a process that the regenerant aqueous solution is passed through and then ultra-pure water is passed through for washing the resin. In the present invention, a cycle of regenerant flowing/ultra-pure water washing is desirably repeated particularly 2 or more times. By repeating the inorganic acid aqueous solution/ultra-pure water flow, the exchange resin can be effectively and homogeneously regenerated and further can be washed up to the inside of the resin due to contraction and swelling of the resin.

Inorganic acid for use is conventionally known inorganic acid such as sulfuric acid and hydrochloric acid.

The concentration of inorganic acid in a regenerant aqueous solution is preferably 5 to 15% by weight, more preferably 5 to 12% by weight. The volume of the regenerant for use is desirably 3 or more times, preferably 4 to 12 times, as much as that of the cation exchange resin to be treated.

The regenerant is passed through downward usually at a SV (space velocity) of 1 to 5 $Hr^{-1}$ and a BV of 0.5 to 1 L/L-R and then ultra-pure water is passed through upward for washing at a SV of 10 to 30 $Hr^{-1}$ and a BV of 0.1 to 0.5 L/L-R.

After the flow of the regenerant and ultra-pure water, an ultra-pure water washing process comprising passing through of ultra-pure water downflow and upflow, is repeated 4 to 9 times to further wash the after-regenerated ion exchange resin. The ultra-pure water is desirably passed through upward at a SV of 10 to 30 $Hr^{-1}$ and a BV of 3 to 5 L/L-R and passed through downward at a SV of 10 to 30 $Hr^{-1}$ and a BV of 3 to 5 L/L-R. The ion exchange resin is desirably washed with ultra-pure water in an amount (volume) of 30 to 60 times as much as that of the resin.

As the method contacting the starting aqueous hydrogen peroxide solution with a H+ type cation exchange resin used for the invention, usually a continuous flow process is employed and the aqueous hydrogen peroxide solution is passed through the cation exchange resin layer desirably at a space velocity (SV) of 5 to 40 $Hr^{-1}$, preferably 10 to 30 $Hr^{-1}$.

In the above manner, by treating with a H+ type cation exchange resin, cationic metal ion impurities in an aqueous hydrogen peroxide solution are removed.

Anion Exchange Resin Treatment

Carbonate Ion ($CO_3^{2-}$) Type or Bicarbonate Ion ($HCO_3^-$) Type Anion Exchange Resin In the present invention, next, the aqueous hydrogen peroxide solution is brought into contact with an anion exchange resin.

As the anion exchange resin, employable are a carbonate ion ($CO_3^{2-}$) type or bicarbonate ion ($HCO_3^-$) type anion exchange resin.

The carbonate ion ($CO_3^{2-}$) type or bicarbonate ion ($HCO_3^-$) type anion exchange resin is a conventionally known anion exchange resin regenerated to the carbonate ion ($CO_3^{2-}$) type or bicarbonate ion ($HCO_3^-$) type anion exchange resin.

As the conventionally known anion exchange resin, strongly basic anion exchange resins obtained by chloromethylation of a styrene-divinylbenzene crosslinked copolymer, followed by amination of the product by trimethylamine or dimethylethanolamine and subsequently by forming a quaternery salt of the product of amination (the exchange resin is a quaternary ammonium group); weak basic exchange resins derived from a styrene-divinylbenzene crosslinked copolymer and having a primary, secondary, or tertiary amine as the exchange group; resins derived from an acrylic acid based crosslinked polymer and having a tertiary amine as the exchange group; and pyridine based anion exchange resins comprising a polymer having a pyridyl group or a substituted pyridyl group. Of these, strongly basic anion exchange resins having a quaternary ammonium group as the exchange group are preferably used in the present invention.

Many kinds of anion exchange resins having a quaternary ammonium group as the exchange group are commercially available. For example, products of DIAION PA cycle such as PA316 and PA416, DIAION SA cycle such as SA10A and SA20A and products of Amberlite IRA cycle such as IRA-400, IRA-410, IRA-900 and IRA-904 are typical examples. These resins are commercially available generally in the form of a chloride ion type.

As the carbonate ion ($CO_3^{2-}$) type or bicarbonate ion ($HCO_3^-$) type anion exchange resin used in the present invention, the above-mentioned anion exchange resin, such as a chloride ion type, converted into a carbonate ion ($CO_3^{2-}$) type or bicarbonate ion ($HCO_3^-$) type is used. The anion exchange resin before being converted into a carbonate ion ($CO_3^{2-}$) type or bicarbonate ion ($HCO_3^-$) type may be not only a chloride ion type but also a hydroxide ion type and a fluoride ion type resin.

Regeneration of the carbonate ion ($CO_3^{2-}$) type or bicarbonate ion ($HCO_3^-$) type anion exchange resin for use in the invention is carried out by converting the chloride ion type anion exchange resin into a hydroxide ion type resin and then into a carbonate ion type or bicarbonate ion type resin.

Also, regeneration of the carbonate ion ($CO_3^{2-}$) type or bicarbonate ion ($HCO_3^-$) type anion exchange resin which has been used is carried out, in the same manner, by converting the chloride ion type anion exchange resin into a hydroxide ion type resin and then into a carbonate ion type or bicarbonate ion type resin.

To convert into a hydroxide ion type anion exchange resin, it is preferred that a process, in which an anion exchange resin is treated with a downflow of strongly alkali aqueous solution (regenerant) and then treated with upflow of ultra-pure water, is repeated 2 or more times thereby to regenerate. Usually, an anion exchange resin is brought into contact with a regenerant aqueous solution by a process that the regenerant aqueous solution is passed through and washed by ultra-pure water. In the present invention, a cycle of passing of regenerant/washing with ultra-pure water is desirably repeated particularly 2 or more times. By repeating the strongly alkali aqueous solution/ultra-pure water flow, the exchange resin can be effectively and homogeneously regenerated and further can be washed to the inside of the resin due to contraction and swelling of the resin.

As the strongly alkali, a conventionally known alkali such as sodium hydroxide and potassium hydroxide is used.

The strongly alkali concentration contained in the regenerant aqueous solution is preferably 2 to 10% by weight, more preferably 2 to 8% by weight. The volume of the regenerant for use is preferably 3 or more times, more preferably 4 to 12 times, as much as that of the anion exchange resin to be treated.

The regenerant is passed through downward usually at a SV (space velocity) of 1 to 5 $Hr^{-1}$ and a BV of 0.5 to 1 L/L-R and then ultra-pure water is passed through upward for washing at a SV of 10 to 30 $Hr^{-1}$ and a BV of 0.1 to 0.5 L/L-R.

After the flow of the regenerant and ultra-pure water, an ultra-pure water washing process comprising passing through of ultra-pure water is passed through downward and upward, is repeated 4 to 9 times to further wash the after-regenerated ion exchange resin. The ultra-pure water is desirably passed through upward at a SV of 10 to 30 $Hr^{-1}$ and a BV of 3 to 5 L/L-R and passed through downward at a SV of 10 to 30 $Hr^{-1}$ and a BV of 3 to 5 L/L-R. The ion exchange resin is desirably washed with ultra-pure water in an amount (volume) of 30 to 60 times as much as that of the resin.

Next, the anion exchange resin converted into a hydroxide ion as described above is treated with a carbonate or bicarbonate aqueous solution (regenerant) to be converted (regenerated) into a carbonate type or bicarbonate ion type anion exchange resin.

The carbonate type or bicarbonate ion type anion exchange resin for use in the present invention is preferably regenerated by repeating a process, 2 or more times, in which the hydroxide ion type anion exchange resin treated as described above is treated with a downflow of carbonate or bicarbonate aqueous solution (regenerant) and then treated with upflow of ultra-pure water.

As the carbonate or bicarbonate, a conventionally known carbonate or bicarbonate such as sodium carbonate, sodium bicarbonate, potassium carbonate and potassium bicarbonate is used. By repeating the carbonate or bicarbonate aqueous solution/ultra-pure water flow, as described above, the exchange resin can be effectively and homogeneously regenerated and further can be washed to the inside of the resin due to contraction and swelling of the resin.

The concentration of carbonate or bicarbonate in a regenerant aqueous solution is preferably 5 to 15% by weight, more preferably 5 to 12% by weight. The volume of the regenerant for use is desirably 3 or more times, preferably 4 to 12 times, as much as that of the anion exchange resin to be treated.

The regenerant is passed through downward usually at a SV (space velocity) of 1 to 5 $Hr^{-1}$ and a BV of 0.5 to 1 L/L-R and then ultra-pure water is passed through upward for washing at a SV of 10 to 30 $Hr^{-1}$ and a BV of 0.1 to 0.5 L/L-R.

After the flow of the regenerant and ultra-pure water, further an ultra-pure water washing process comprising passing through of downflow of ultra-pure water and upflow of ultra-pure water is repeated 4 to 9 times to further wash the after-regenerated ion exchange resin. The upflow of ultra-pure water is passed through preferably at a SV of 10 to 30 $Hr^{-1}$ and a BV of 3 to 5 L/L-R and downflow of ultra-pure water is preferably passed through at a SV of 10 to 30 $Hr^{-1}$ and a BV of 3 to 5 L/L-R. It is preferred that washing is carried out with ultra-pure water in an amount (volume) of 30 to 60 times as much as that of the resin.

As the method contacting an aqueous hydrogen peroxide solution with a carbonate ion type or bicarbonate ion type anion exchange resin used for the invention, usually a continuous flow process is employed. The aqueous hydrogen peroxide solution is passed through the anion exchange resin layer desirably at a space velocity (SV) of 5 to 40 $Hr^{-1}$, preferably 10 to 30 $Hr^{-1}$.

The contact of an anion exchange resin and aqueous hydrogen peroxide solution is carried out at a low temperature in view of safety, such as prevention of degradation of the resin by oxidation, prevention of occurrence of cracker gas from hydrogen peroxide and heat generation by decomposition of hydrogen peroxide at the contact. Particularly, in the aqueous hydrogen peroxide solution treated with a $H^+$ type cation exchange resin, $H^+$ is sometimes contained more than that generated by dissociation of the aqueous hydrogen peroxide solution, and the $H^+$ and an anion exchange group $CO_3^{2-}$ or $HCO_3^-$ react neutrally with each other and sometimes heat generation occurs. Further, in contacting the carbonate ion type or bicarbonate ion type anion exchange resin and the aqueous hydrogen peroxide solution, cracker gas occurs by decomposition of the aqueous hydrogen peroxide solution and further heat generation by decomposition may occur. For the above-mentioned reasons, in treating an aqueous hydrogen peroxide solution with an anion exchange resin, it is preferred that the aqueous hydrogen peroxide solution has been cooled at a low temperature, 5° C. or less.

Fluoride Ion ($F^-$) Type Anion Exchange Resin

In the process for producing a purified aqueous hydrogen peroxide solution of the present invention, the aqueous hydrogen peroxide solution may be contacted with a fluoride ion type anion exchange resin after being brought into contact with the $H^+$ type cation exchange resin, before being brought into contact with the above-mentioned carbonate ion ($CO_3^{2-}$) type or bicarbonate ion ($HCO_3^-$) type anion exchange resin.

By contacting the anion exchange resin converted into a fluoride ion type with an aqueous hydrogen peroxide solution, silica dissolved in the aqueous hydrogen peroxide solution is captured by the anion exchange resin and removed.

The fluoride ion ($F^-$) type anion exchange resin is one in which the conventionally known anion exchange resin is regenerated to a fluoride ion type.

As the conventionally known anion exchange resins, employable are the same as mentioned above.

The fluoride ion type anion exchange resin used for the present invention is an anion exchange resin in which one of a chloride ion type anion exchange resin, a hydroxide ion type anion exchange resin, a carbonate ion type anion exchange resin and a bicarbonate ion type anion exchange resin.

The regenerant used for converting into a fluoride ion type anion exchange resin is at least one kind of fluorine compounds selected from the group consisting of sodium fluoride, potassium fluoride and ammonium fluoride.

To convert the anion exchange resin into a fluoride ion type, the anion exchange resin is contacted with the above mentioned aqueous solution containing a regenerant. Effective process for contacting the anion exchange resin and the aqueous hydrogen peroxide solution is a continuous flow process in which the anion exchange resin is packed into a column and then the regenerant aqueous solution is passed through the column, ultra-pure water is passed through to wash the anion exchange resin thoroughly. The concentration of the regenerant is usually 1 to 4% by weight, desirably 2 to 4% by weight. The amount (volume) of the regenerant for passing through is desirably 3 or more times, preferably 4 to 12 times, as much as that of the exchange resin.

In the present invention, in converting the anion exchange resin into a fluoride ion type, such cycle of flow of the regenerant aqueous solution and ultra-pure water is desirably repeated 2 or more times. Specifically, a cycle of flow of a downflow of regenerant aqueous solution and upflow of ultra-pure water is desirably repeated 2 or more times.

By repeating the fluorine compound aqueous solution/ultra-pure water flow, the ion exchange resin can be effectively and homogeneously regenerated and further can be washed up to the inside of the resin due to contraction and swelling of the resin.

The regenerant is passed through downward usually at a SV (space velocity) of 1 to 5 $Hr^{-1}$ and a BV of 0.5 to 1 L/L-R and then ultra-pure water is passed through upward for washing at a SV of 10 to 30 $Hr^{-1}$ and a BV of 0.1 to 0.5 L/L-R.

After the flow of the regenerant and ultra-pure water, further an ultra-pure water washing process comprising passing through of downflow of ultra-pure water and upflow of ultra-pure water is repeated 4 to 9 times to further wash the after-regenerated ion exchange resin. The upflow of ultra-pure water is passed through preferably at a SV of 10 to 30 $Hr^{-1}$ and a BV of 3 to 5 L/L-R and the downflow of ultra-pure water is preferably passed through at a SV of 10 to 30 $Hr^{-1}$ and a BV of 3 to 5 L/L-R. It is preferred that washing is carried out with ultra-pure water in an amount (volume) of 30 to 60 times as much as that of the resin.

In treating with a fluoride ion type anion exchange resin, an aqueous hydrogen peroxide solution is not necessarily cooled upon contacting the exchange resin as in the case of contacting the solution with the carbonate type or bicarbonate type anion exchange resin, since the aqueous hydrogen peroxide solution is not easily decomposed.

In the present invention, as the method contacting the aqueous hydrogen peroxide solution with the fluoride ion type anion exchange resin, usually a continuous flow process is employed and the aqueous hydrogen peroxide solution is passed through the anion exchange resin layer desirably at a space velocity (SV) of 5 to 40 $Hr^{-1}$, preferably 10 to 30 $Hr^{-1}$.

In the purified aqueous hydrogen peroxide solution treated with the fluoride ion type anion exchange resin, fluoride ions occurred by the ion exchange are contained. However, the fluoride ions can be removed by coming in contact with an anion exchange resin such as the above-mentioned carbonate or bicarbonate type resin.

In the above manner, by contacting the anion exchange resin with the aqueous hydrogen peroxide solution, dissoluble silica and anionic metal complex impurities and sulfate ions derived from other anions and spent $H^+$ type cation exchange resins are removed.

$H^+$ Type Cation Exchange Resin Treatment (Second)

In the present invention, after the anion exchange resin is contacted with the aqueous hydrogen peroxide solution in the above manner, again a $H^+$ type cation exchange resin is contacted with the aqueous hydrogen peroxide solution. As the $H^+$ type cation exchange resin, there can be used the same ones as mentioned above. Bringing the aqueous hydrogen peroxide solution into contact with the cation exchange resin is carried out by the continuous flow process. The aqueous hydrogen peroxide solution is passed through the $H^+$ type cation exchange resin layer desirably at a space velocity (SV) of 5 to 40 $Hr^{-1}$, preferably 10 to 30 $Hr^{-1}$.

By treating with the $H^+$ type cation exchange resin again, even a minute amount of $Na^+$, $K^+$ and $Al^{3+}$ contained in the anion exchange resin as impurities can be removed. Namely, metal ion impurities can be removed up to the very high level such as a ppt level or its vicinities. Counter ions of $Na^+$, $K^+$ and $Al^{3+}$, which are to be removed, are carbonate ions or bicarbonate ions which are evaporated as carbon dioxide after the cation exchange and thereby do not remain in the aqueous hydrogen peroxide solution. When the aqueous hydrogen peroxide solution is not treated with the second $H^+$ type cation exchange resin, the minute amount of metal ions contained as impurities sometimes may not be removed.

Filtration Treatment

The process for producing a purified aqueous hydrogen peroxide solution of the present invention, prior to the three-step or four-step treatment with ion exchange resins, it is preferred that the aqueous hydrogen peroxide solution to which a flocculating agent is added be filtrated by a fine filter so as to remove insoluble metal ion impurities contained in the aqueous hydrogen peroxide solution as solid impurities.

The insoluble metal ion impurities as well as dissoluble metal ion impurities are originated from the water used at production of hydrogen peroxide, floating dust in the air and materials of production equipments.

The flocculating agent is added so as to condense the insoluble metal ion impurities in the aqueous hydrogen peroxide solution to be filtrated and is usually a phosphorus compound. Preferable is a phosphorus compound selected from the group consisting of phosphoric acid, polyphosphoric acid, disodium dihydrogen pyrophosphate, aminotri (methylenephosphonic acid) and salt thereof, and ethylenediaminetetra(methylenephosphonic acid) and salt thereof.

Particularly when Al ion impurities are contained in an aqueous hydrogen peroxide solution, the phosphorus based compound is preferably added in an amount that the atomic ratio (Al/P) of the Al ion impurities contained in the aqueous hydrogen peroxide solution in terms of an Al atom to the phosphorus based compound in terms of a phosphorus atom (P) is 0.045 or less, preferably 0.005 to 0.045.

After the phosphorus based compound is added, it is preferred that the aqueous hydrogen peroxide solution has been aged for usually more than a day, preferably 1 to 5 days. Aging may be carried out with or without stirring. By the aging, insoluble metal ion impurities in the aqueous hydrogen peroxide solution are flocculated and grown to be filtrated.

The fine filter for use in the present invention has an average pore size of 0.2 $\mu$m or less, preferably 0.1 $\mu$m or less. Materials constituting the fine filter are not restricted as far as the materials do not contain components solving into the aqueous hydrogen peroxide solution. However, materials comprising fluorine resins, polyolefin resins such as polyethylene and polypropylene, polysulfone resins and polycarbonate resins are used. Of these, materials comprising fluorine resins are preferable.

Further, optionally, ultra-pure water is added to the aqueous hydrogen peroxide obtained by the above mentioned process according to the present invention so as to regulate the hydrogen peroxide concentration. As the ultra-pure water, one from which impurities are highly removed is preferably used.

By the above operation, a high-purity purified aqueous hydrogen peroxide solution from which metal ion impurities are removed up to a ppt level or its vicinities can be prepared.

Furthermore, in the present invention, there may be used a purified aqueous hydrogen peroxide solution from which other impurities such as organic impurities and silicon oxide compounds have been preliminarily removed by the conventionally known methods. The high-purity purified aqueous hydrogen peroxide solution obtained by the process of the invention may be further purified by the conventionally known methods by removing other impurities such as organic impurities and silicon oxide compounds. As the conventionally known methods to remove other impurities such as organic impurities and silicon oxide compounds, methods using a distillation, an ultrafiltration film, a chelate resin and the like. By combining those methods and the process of the present invention, not only metal ion impurities but also other impurities can be highly removed.

According to the process of the present invention, metal ion impurities contained in an aqueous hydrogen peroxide solution can be effectively removed, and a very high-quality aqueous hydrogen peroxide solution having a metal ion impurity content of a few ppt level or its vicinities can be produced. Further, the aqueous hydrogen peroxide solution purified by the process of the present invention has a good and stable duplicativity of level of removing metal ion impurities.

EXAMPLES

The present invention is described more specifically with reference to examples. However, the present invention is not limited to the examples.

The contents of metal ion impurities were measured by a flameless atomic absorption spectrometry, ICP-AES method and ICP-MS method. The contents of organic impurities (TOC: total organic carbon) were measured by a combustion-infrared method. Further, ppb and ppt denote ppb by weight and ppt by weight, respectively.

Example 1

Acidic sodium pyrophosphate was added to 60.1% by weight of aqueous hydrogen peroxide solution containing metal ion impurities shown in the following Table 1 to prepare 0.070 g/liter of the mixed solution. Then the mixture was aged without stirring for 3 days and filtrated by a filter of an average pore size of 0.1 μm. The ratio (Al/P atomic ratio) of metal atom Al in metal ion impurities to phosphorus atom in the added acidic sodium pyrophosphate was 0.039.

The filtrated aqueous hydrogen peroxide solution was continuously passed through a column packed with a $H^+$ type cation exchange resin at a space velocity (SV) of 15 $Hr^{-1}$ to contact with the first $H^+$ type cation exchange resin, secondly continuously passed through a column packed with a bicarbonate ion type anion exchange resin with cooling at −3° C. at a space velocity (SV) of 15 $Hr^{-1}$ to contact with the bicarbonate ion type anion exchange resin, and thirdly continuously passed through a column packed with a $H^+$ type cation exchange resin at a space velocity (SV) of 15 $Hr^{-1}$ to contact with the second $H^+$ type cation exchange resin.

Regeneration of the ion exchange resin was carried out at an ion exchange tower (regeneration tower) which was different from an aqueous hydrogen peroxide solution purifying tower.

As the first and second $H^+$ type cation exchange resins, the spent SK1B which was regenerated was used. As a regenerant, 10% by weight of hydrochloric acid aqueous solution was used. The regeneration of the cation exchange resin was carried out as follows. The cation exchange resin was packed into the regeneration tower different from the purifying tower. After an aqueous solution containing the regenerant was passed downward through the tower at a SV of 2.25 $Hr^{-1}$ and a BV of 0.75 L/L-R, the flow of the regenerant was terminated. Subsequently, ultra-pure water was passed upward through the tower at a SV of 13.2 $Hr^{-1}$ and a BV of 0.3 L/L-R. The above processes were considered as one cycle of processes and the cycle was repeated 10 times. Next, ultra-pure water was passed downward through at a SV of 13.2 $Hr^{-1}$ and a BV of 3.3 L/L-R and then passed through upward at the same SV and BV rates. The processes were considered as one cycle of processes and the cycle was repeated 6 times for washing.

As the bicarbonate ion type anion exchange resin, the spent SA20A which was regenerated was used. First, the spent anion exchange resin was regenerated by sodium hydroxide. As a regenerant, 5% by weight of sodium hydroxide aqueous solution was used. The anion exchange resin was packed into the regeneration tower different from the purifying tower. After an aqueous solution containing the regenerant was passed downward through the tower at a SV of 2.25 $Hr^{-1}$ and a BV of 0.75 L/L-R, the flow of the regenerant was terminated. Subsequently, ultra-pure water was passed upward through the tower at a SV of 13.2 $Hr^{-1}$ and a BV of 0.3 L/L-R. The above processes were considered as one cycle of processes and the cycle was repeated 6 times. Next, ultra-pure water was passed downward through at a SV of 13.2 $Hr^{-1}$ and a BV of 3.3 L/L-R and then passed through upward at the same SV and BV rates. The processes were considered as one cycle of processes and the cycle was repeated 5 times for washing to prepare an $OH^-$ type anion exchange resin.

Next, the $OH^-$ type anion exchange resin was regenerated by sodium bicarbonate. As a regenerant, 8% by weight of sodium bicarbonate aqueous solution was used. At regenerating of the sodium bicarbonate, also the anion exchange resin was packed into the regeneration tower different from the purifying tower. After an aqueous solution containing the regenerant was passed downward through the tower at a SV of 2.25 $Hr^{-1}$ and a BV of 0.75 L/L-R, the flow of the regenerant was terminated. Subsequently, ultra-pure water was passed upward through the tower at a SV of 13.2 $Hr^{-1}$ and a BV of 0.3 L/L-R. The above processes were considered as one cycle of processes and the cycle was repeated 12 times. Next, ultra-pure water was passed downward through at a SV of 13.2 $Hr^{-1}$ and a BV of 3.3 L/L-R and then passed through upward at the same SV and BV rates. The processes were considered as one cycle of processes and the cycle was repeated 6 times for washing to prepare a $HCO_3^-$ type anion exchange resin.

Each of ion exchange resins regenerated in the above mentioned manner were packed into each of purifying columns in a slurry state, respectively.

After an aqueous hydrogen peroxide solution was passed through each of ion exchange resin columns, the purified aqueous hydrogen peroxide solution discharged from the final $H^+$ cation exchange resin column was diluted with ultra-pure water from which impurities were highly removed to prepare a solution having a hydrogen peroxide concentration of 31% by weight.

The metal ion impurity concentration of the obtained purified aqueous hydrogen peroxide solution was measured by frameless atomic absorption spectrometry and ICP-MS method. Further, metal ion impurities contained in the starting aqueous hydrogen peroxide solution were measured by frameless atomic absorption spectrometry and ICP-AES method. Organic impurities were measured by combustion-infrared type TOC measuring apparatus.

The results were shown in Table 2.

TABLE 1

Metal impurities contained in the starting aqueous hydrogen peroxide solution

| Impurities | Analyzed value (ppb) |
|---|---|
| Al | 770 |
| Cu | 0.2 |
| Fe | 4.5 |
| K | 132 |
| Na | 15160 |
| Pb | 2 |
| Ca | 0.6 |
| Mg | 0.6 |

TABLE 2

Amounts of metal impurities contained in the obtained purified aqueous hydrogen peroxide solution

| | measuring limit (ppt) | measured value (ppt) |
|---|---|---|
| Ag | 0.5 | ND |
| Al | 0.2 | 0.2 |
| As | 2 | ND |
| Au | 0.2 | ND |
| B | 4 | ND |
| Ba | 0.1 | ND |
| Be | 5 | ND |
| Bi | 0.2 | ND |
| Ca | 2 | ND |
| Cd | 0.3 | ND |
| Co | 1 | ND |
| Cr | 1 | 1 |
| Cu | 0.5 | ND |
| Fe | 0.5 | 0.7 |
| Ga | 0.5 | ND |
| Ge | 2 | ND |
| In | 0.1 | ND |
| K | 2 | ND |
| Li | 0.02 | ND |
| Mg | 0.2 | ND |
| Mn | 0.3 | ND |
| Mo | 0.3 | ND |
| Na | 0.5 | ND |
| Nb | 0.1 | ND |
| Ni | 0.7 | ND |
| Pb | 0.1 | ND |
| Pd | 0.3 | ND |
| Pt | 0.2 | ND |
| Sb | 0.3 | ND |
| Sn | 0.8 | ND |
| Sr | 0.05 | ND |
| Ta | 0.1 | ND |
| Ti | 2 | ND |
| Tl | 0.1 | ND |
| V | 1 | ND |
| Zn | 2 | ND |
| Zr | 0.1 | 0.1 |

ND means not more than the measuring limit.

Example 2

Acidic sodium pyrophosphate was added to 60.1% by weight of aqueous hydrogen peroxide solution containing metal ion impurities in an amount shown in Table 1 except that the Al ion concentration was 0.9 ppm to prepare 0.062 g/liter of a mixed solution. Then the mixture was left alone for 3 days to be aged and filtrated by a filter of an average pore size of 0.1 μm. The ratio (Al/P atomic ratio) of the Al atom to the phosphorus atom in the added acidic sodium pyrophosphate was 0.052.

The resultant aqueous hydrogen peroxide solution was brought into contact with ion exchange resins and purified in the same manner as in Example 1. The metal ion impurity concentration of the obtained aqueous hydrogen peroxide solution was 81 ppt of an Al ion concentration and other metal ion impurities were removed as the same as in Example 1.

Example 3

An aqueous hydrogen peroxide solution was purified in the same manner as in Example 1 except that the filtrated aqueous hydrogen peroxide solution was contacted with a fluoride ion type anion exchange resin after the solution was treated with an adsorption resin XAD-4 and contacted with the first $H^+$ type cation exchange resin and before contacted with a bicarbonate ion type anion exchange resin, and then contacted with bicarbonate ion type anion exchange resin and subsequently contacted with the second $H^+$ type cation exchange resin.

The adsorption resin XAD-4 was regenerated as follows. 39% by weight of 2-propanol as a regenerant was passed through upward at a SV of 4.8 $Hr^{-1}$ and a BV of 3 L/L-R, and then ultra-pure water was passed through downward at a SV of 13.2 $Hr^{-1}$ and a BV of 3.3 L/L-R and passed through upward at the same SV and BV rates. The processes were considered as one cycle of processes and the cycle was repeated 6 times for washing to prepare the adsorption resin for use.

As the fluoride ion type anion exchange resin, the spent SA20A which was regenerated was used. As a regenerant, 3% by weight of sodium fluoride aqueous solution (having $SiF_6$ of 100 ppm or less) was used. The regeneration of the fluoride ion type anion exchange resin was carried out in the following manner. The spent anion exchange resin was packed into the regeneration tower different from the purifying tower. After an aqueous solution containing the regenerant (sodium fluoride) was passed downward through the tower at a SV of 2.25 $Hr^{-1}$ and a BV of 0.75 L/L-R, the flow of the regenerant was terminated. Subsequently, ultra-pure water was passed upward through the tower at a SV of 13.2 $Hr^{-1}$ and a BV of 0.3 L/L-R. The above processes were considered as one cycle of processes and the cycle was repeated 6 times. Next, ultra-pure water was passed through downward at a SV of 13.2 $Hr^{-1}$ and a BV of 3.3 L/L-R and then passed through upward at the same SV and BV rates. The processes were considered as one cycle of processes and the cycle was repeated 6 times for washing.

As a result, impurities can be removed to the same level as that of Example 1. Further, in addition to the impurities shown in Table 2, Si ion and organic impurities were also removed. Si ion was removed up to 50 ppt or less. Si ion concentration is 2.4 ppb, before 60% aqueous hydrogen peroxide solution was purified. TOC was removed up to around 3 ppm. TOC concentration is 55 ppm before 60% aqueous hydrogen peroxide solution was purified.

Comparative Example 1

In Example 1, after the $H^+$ type cation exchange resin treatment was carried out and, further, an aqueous hydrogen peroxide solution was passed through the bicarbonate ion type anion exchange resin, the solution removed from the outlet was diluted with ultra-pure water to prepare 31% by weight aqueous hydrogen peroxide solution. The metal ion impurity concentration of the obtained aqueous hydrogen peroxide solution was high, such that Na ion concentration is 21 ppt, K ion concentration is 14 ppt and Al ion concentration is 38 ppt.

Comparative Example 2

In Example 3, after the H⁺ type cation exchange resin treatment was carried out and an aqueous hydrogen peroxide solution was treated with the fluoride ion type anion exchange resin and then passed through the bicarbonate ion type anion exchange resin, the solution removed from the outlet was diluted with ultra-pure water to prepare a 31% by weight aqueous hydrogen peroxide solution. The metal ion impurity concentration of the obtained aqueous hydrogen peroxide solution was high, such that Na ion concentration is 250 ppt, K ion concentration is 10 ppt, Al ion concentration is 20 ppt and Ti ion concentration is 25 ppt.

What is claimed is:

1. A process for producing a purified aqueous hydrogen peroxide solution comprising contacting an aqueous hydrogen peroxide solution containing metal ion impurities in a four-step ion exchange resin consisting of firstly with a H⁺ cation exchange resin, secondly with a fluoride ion (F⁻) anion exchange resin, thirdly with a carbonate ion ($CO_3^{2-}$) or bicarbonate ion ($HCO_3^-$) anion exchange resin, and fourthly with a H⁺ cation exchange resin.

2. The process for producing a purified aqueous hydrogen peroxide solution as claimed in claim 1, wherein the aqueous hydrogen peroxide solution is contacted with an adsorption resin before contacting the H⁺ cation exchange resin.

3. The process for producing a purified aqueous hydrogen peroxide solution as claimed in claim 1, wherein said H⁺ cation exchange resin is regenerated by repeating a process, two or more times, in which the cation exchange resin is treated with a downward flowing inorganic acid aqueous solution and then washed with ultra-pure water.

4. The process for producing a purified aqueous hydrogen peroxide solution as claimed in claim 1, wherein the carbonate ion ($CO_3^{2-}$) or bicarbonate ion ($HCO_3^-$) anion exchange resin is regenerated by repeating a process, two or more times, in which the anion exchange resin is treated with a sodium carbonate or sodium bicarbonate aqueous solution and then washed with ultra-pure water.

5. The process for producing a purified aqueous hydrogen peroxide solution as claimed in claim 1, wherein the fluoride ion (F⁻) anion exchange resin is regenerated by repeating a process, two or more times, in which the anion exchange resin is treated with at least one fluorine compound aqueous solution selected from the group consisting of sodium fluoride, potassium fluoride and ammonium fluoride and then washed with ultra-pure water.

6. The process for producing a purified aqueous hydrogen peroxide solution as claimed in claim 2, wherein the adsorption resin is regenerated by treating with an alcohol aqueous solution as a regenerant and then washing with ultra-pure water.

7. The process for producing a purified aqueous hydrogen peroxide solution as claimed in claim 1, wherein the hydrogen peroxide concentration in the aqueous hydrogen peroxide solution is 40 to 70% by weight.

8. The process for producing a purified aqueous hydrogen peroxide solution as claimed in claim 1, wherein said purified aqueous hydrogen peroxide solution is obtained by filtrating solid impurities contained in the aqueous hydrogen peroxide solution to which a flocculating agent has been preliminarily added, by a filter having an average pore size of 0.2 μm or less.

9. The process for producing a purified aqueous hydrogen peroxide solution as claimed in claim 8, wherein said flocculating agent is at least one phosphorus based compound selected from the group consisting of phosphoric acid, polyphosphoric acid, acidic sodium pyrophosphate, aminotri(methylenephosphoric acid) and salt thereof, and ethelenediaminetetra(methylenephosphoric acid) and salt thereof.

10. The process for producing a purified aqueous hydrogen peroxide solution as claimed in claim 9, wherein said phosphorus based compound is added in an amount that the atomic ratio (Al/P) of the Al ion impurity contained in the aqueous hydrogen peroxide solution in terms of a metal atom Al to the phosphorus based compound in terms of a phosphorus atom is 0.045 or less.

11. The process for producing a purified aqueous hydrogen peroxide solution as claimed in claim 8, wherein the fine filter has an average pore size of 0.1 μm or less.

12. The process for producing a purified aqueous hydrogen peroxide solution as claimed in claim 1, wherein the aqueous hydrogen peroxide solution is contacted with an adsorption resin before contacting the H⁺ cation exchange resin.

13. The process for producing a purified aqueous hydrogen peroxide solution as claimed in claim 2, wherein said H⁺ cation exchange resin is regenerated by repeating a process, two or more times, in which the cation exchange resin is treated with a downward flowing inorganic acid aqueous solution and then washed with ultra-pure water.

14. The process for producing a purified aqueous hydrogen peroxide solution as claimed in claim 2, wherein the carbonate ion ($CO_3^{2-}$) or bicarbonate ion ($HCO_3^-$) anion exchange resin is regenerated by repeating a process, two or more times, in which the anion exchange resin is treated with a sodium carbonate or sodium bicarbonate aqueous solution and then washed with ultra-pure water.

15. The process for producing a purified aqueous hydrogen peroxide solution as claimed in claim 3, wherein the carbonate ion ($CO_3^{2-}$) or bicarbonate ion ($HCO_3^-$) anion exchange resin is regenerated by repeating a process, two or more times, in which the anion exchange resin is treated with a sodium carbonate or sodium bicarbonate aqueous solution and then washed with ultra-pure water.

16. The process for producing a purified aqueous hydrogen peroxide solution as claimed in claim 2, wherein the fluoride ion (F⁻) anion exchange resin is regenerated by repeating a process, two or more times, in which the anion exchange resin is treated with at least one fluorine compound aqueous solution selected from the group consisting of sodium fluoride, potassium fluoride and ammonium fluoride and then washed with ultra-pure water.

17. The process for producing a purified aqueous hydrogen peroxide solution as claimed in claim 3, wherein the fluoride ion (F⁻) anion exchange resin is regenerated by repeating a process, two or more times, in which the anion exchange resin is treated with at least one fluorine compound aqueous solution selected from the group consisting of sodium fluoride, potassium fluoride and ammonium fluoride and then washed with ultra-pure water.

18. The process for producing a purified aqueous hydrogen peroxide solution as claimed in claim 4, wherein the fluoride ion (F⁻) anion exchange resin is regenerated by repeating a process, two or more times, in which the anion exchange resin is treated with at least one fluorine compound aqueous solution selected from the group consisting of sodium fluoride, potassium fluoride and ammonium fluoride and then washed with ultra-pure water.

19. The process for producing a purified aqueous hydrogen peroxide solution as claimed in claim 3, wherein the adsorption resin is regenerated by treating with an alcohol aqueous solution as a regenerant and then washing with ultra-pure water.

20. The process for producing a purified aqueous hydrogen peroxide solution as claimed in claim 4, wherein the adsorption resin is regenerated by treating with an alcohol aqueous solution as a regenerant and then washing with ultra-pure water.

21. The process for producing a purified aqueous hydrogen peroxide solution as claimed in claim 5, wherein the adsorption resin is regenerated by treating with an alcohol aqueous solution as a regenerant and then washing with ultra-pure water.

22. The process for producing a purified aqueous hydrogen peroxide solution as claimed in claim 9, wherein the fine filter has an average pore size of 0.1 $\mu$m or less.

23. The process for producing a purified aqueous hydrogen peroxide solution as claimed in claim 10, wherein the fine filter has an average pore size of 0.1 $\mu$m or less.

* * * * *

UNITED STATES PATENT AND TRADEMARK OFFICE
CERTIFICATE OF CORRECTION

PATENT NO. : 6,896,867 B2
DATED : May 24, 2005
INVENTOR(S) : Tanaka et al.

It is certified that error appears in the above-identified patent and that said Letters Patent is hereby corrected as shown below:

Column 4,
Line 51, "removed, As" should read -- removed. As --.

Column 6,
Line 35, the paragraph should end after "as that of the resin.".
Line 54, delete the rest of the paragraph beginning with "shows how many" and ending with "that of resin.".
Line 67, this is a duplication.

Signed and Sealed this

Twenty-second Day of November, 2005

JON W. DUDAS
*Director of the United States Patent and Trademark Office*